US009676420B2

(12) United States Patent
Reddy et al.

(10) Patent No.: US 9,676,420 B2
(45) Date of Patent: Jun. 13, 2017

(54) B-PILLAR DEFORMATION MODE

(71) Applicant: Tesla Motors, Inc., Palo Alto, CA (US)

(72) Inventors: Sekhar R B Reddy, Pleasanton, CA (US); Andy Kung, San Francisco, CA (US); Dan Moll, Pleasanton, CA (US); Ash Williams, San Francisco, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 14/969,197

(22) Filed: Dec. 15, 2015

(65) Prior Publication Data

US 2017/0057552 A1 Mar. 2, 2017

Related U.S. Application Data

(60) Provisional application No. 62/213,562, filed on Sep. 2, 2015.

(51) Int. Cl.
*B62D 21/15* (2006.01)
*B62D 25/02* (2006.01)
*B62D 25/04* (2006.01)
*B62D 25/06* (2006.01)

(52) U.S. Cl.
CPC .......... *B62D 21/157* (2013.01); *B62D 25/02* (2013.01); *B62D 25/04* (2013.01); *B62D 25/06* (2013.01)

(58) Field of Classification Search
CPC ...... B62D 25/02; B62D 25/025; B62D 25/04; B62D 25/06; B62D 21/15; B62D 21/157
USPC .......... 296/29, 210, 187.13, 187.12, 203.01, 296/203.03, 193.05, 193.06
See application file for complete search history.

(56) References Cited

U.S. PATENT DOCUMENTS

| | | | | |
|---|---|---|---|---|
| 4,378,658 A | * | 4/1983 | DeLorean | E05F 1/1238 16/308 |
| 4,382,626 A | * | 5/1983 | Spooner | B62D 23/00 29/509 |
| 4,626,026 A | * | 12/1986 | Hasegawa | B60J 7/11 16/364 |
| 4,925,238 A | * | 5/1990 | Thaler | B60J 7/0015 160/267.1 |
| 4,940,283 A | * | 7/1990 | Androy | B60J 7/0573 296/216.04 |
| 5,009,465 A | * | 4/1991 | Induni | B60J 7/1291 160/327 |
| 5,035,463 A | * | 7/1991 | Kato | B60J 7/1642 296/146.11 |
| 5,110,178 A | * | 5/1992 | Love | B60J 7/11 296/136.02 |
| 5,984,402 A | * | 11/1999 | Takeuchi | B62D 21/157 296/187.12 |
| 5,992,918 A | | 11/1999 | Gobart | |

(Continued)

FOREIGN PATENT DOCUMENTS

DE 102004007054 9/2005

*Primary Examiner* — Gregory Blankenship
(74) *Attorney, Agent, or Firm* — Garlick & Markison; Bruce E. Garlick

(57) ABSTRACT

A vehicle comprises: a vehicle structure without a continuous roof rail; a B-pillar attached to the vehicle structure, the B-pillar having a first initiator; and a header attached to the B-pillar and extending at least partly across the vehicle, the header having a second initiator, wherein the first and second initiators are configured to provide a B-pillar deformation mode upon side impact.

18 Claims, 9 Drawing Sheets

(56) References Cited

U.S. PATENT DOCUMENTS

| | | | | |
|---|---|---|---|---|
| 6,478,367 B2* | 11/2002 | Ishikawa | | B62D 25/04 |
| | | | | 296/199 |
| 6,988,763 B2* | 1/2006 | Saeki | | B62D 21/157 |
| | | | | 296/187.03 |
| 7,213,874 B2* | 5/2007 | Osterberg | | B62D 25/06 |
| | | | | 296/203.03 |
| 7,488,022 B2* | 2/2009 | Belwafa | | B62D 25/04 |
| | | | | 296/187.13 |
| 7,857,377 B2* | 12/2010 | Chen | | B62D 25/025 |
| | | | | 296/203.03 |
| 8,371,642 B2* | 2/2013 | Baccouche | | B62D 21/15 |
| | | | | 296/187.12 |
| 8,449,015 B2* | 5/2013 | Brown | | B60J 5/0473 |
| | | | | 296/146.12 |
| 8,480,163 B2* | 7/2013 | Mori | | B62D 21/157 |
| | | | | 29/897.2 |
| 8,662,567 B2* | 3/2014 | Aul | | B62D 25/04 |
| | | | | 296/193.05 |
| 8,662,573 B2* | 3/2014 | Vantrease | | B62D 25/06 |
| | | | | 296/203.03 |
| 8,894,136 B2* | 11/2014 | Shono | | B62D 25/06 |
| | | | | 296/203.03 |
| 2006/0208537 A1* | 9/2006 | Dingman | | B62D 25/04 |
| | | | | 296/193.05 |
| 2007/0001486 A1* | 1/2007 | Dowdey | | B60J 7/11 |
| | | | | 296/218 |
| 2008/0122259 A1* | 5/2008 | Matsui | | B62D 21/157 |
| | | | | 296/187.12 |
| 2011/0101734 A1 | 5/2011 | Guenther | | |
| 2012/0151843 A1 | 6/2012 | Rawlinson | | |
| 2012/0153675 A1 | 6/2012 | Rawlinson | | |
| 2012/0153676 A1 | 6/2012 | Shono | | |
| 2012/0161472 A1 | 6/2012 | Rawlinson | | |
| 2012/0313400 A1 | 12/2012 | Balzer | | |
| 2013/0020833 A1 | 1/2013 | Yao | | |
| 2013/0088044 A1 | 4/2013 | Charbonneau | | |
| 2014/0028057 A1* | 1/2014 | Nishimura | | B62D 25/06 |
| | | | | 296/193.06 |
| 2014/0300139 A1* | 10/2014 | Torii | | B62D 25/04 |
| | | | | 296/187.12 |

\* cited by examiner

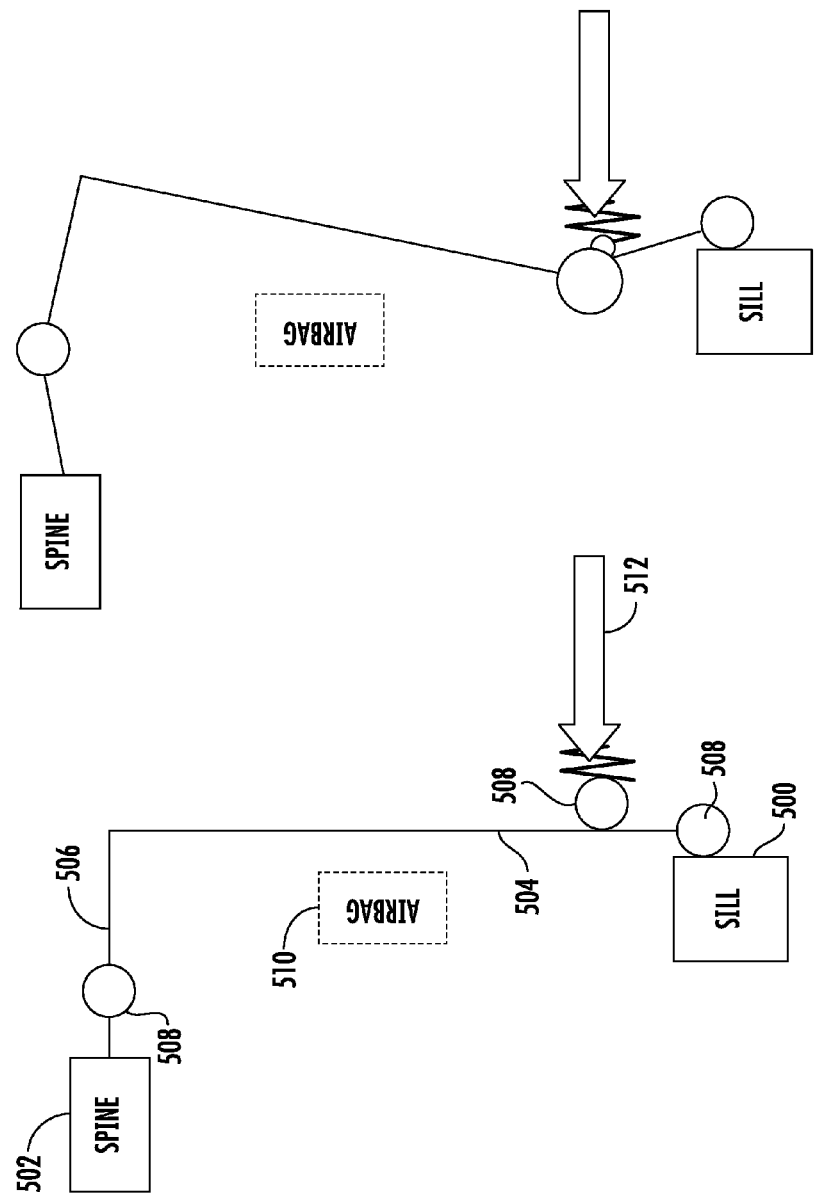

B-PILLAR DEFORMATION MODE

CROSS-REFERENCE TO RELATED APPLICATION

This application claims the benefit of the filing date of U.S. provisional application 62/213,562, filed Sep. 2, 2015 and entitled B-PILLAR DEFORMATION MODE, the entire contents of which are incorporated herein by reference.

BACKGROUND

The bodies of many vehicles are designed with a number of pillars extending upward from the vehicle's lower structure to at least partially enclose the passenger compartment. These are sometimes referred to, starting at the front of the vehicle, as A-, B- or C-pillars, and so on. Different types of vehicles can have different numbers of pillars. One purpose of these pillars can be to guide load paths through the vehicle body, both during ordinary driving and in crash situations. FIG. 1 shows an example of load paths in a prior art vehicle 100. The vehicle body has an A-pillar 102 and a B-pillar 104 on each side thereof. The extension of each A-pillar is a roof rail 106 that extends toward the rear of the vehicle, where it meets the C-pillar. Along the way, the end of the B-pillar meets the roof rail and is attached thereto.

In the event of an impact from the side of the vehicle, the B-pillar will likely receive at least some of the load. This is here schematically illustrated using an arrow 108. In this prior art vehicle, the B-pillar uses the roof rail to transfer some of the load through the vehicle body. This is schematically illustrated using arrows 110 that represent transverse load transfer along the roof line, and arrows 112 representing longitudinal load transfer across the width of the vehicle.

FIG. 2 schematically shows a bending mode in the prior art vehicle of FIG. 1. A side sill 200 is here shown in a head-on perspective—this is the part of the vehicle's body structure that runs along the outside of the chassis on each side of the vehicle, and to which the bottom of a B-pillar 202 is attached. The B-pillar is here schematically illustrated using lines 204 that connect joints 206 to each other. The B-pillar is shown in a post-impact state, assuming that an impact load has acted on the B-pillar in a direction from right to left in the figure. The joint in the center of the B-pillar is therefore seen to have been displaced inward in the vehicle relative to a dashed line 208, which represents the undeformed state of the B-pillar. That is, the bending mode in this prior art vehicle relies on the roof rail (at the uppermost joint 206) for load transfer and has a certain intrusion of the B-pillar into the passenger compartment due to the side impact. This can reduce the effectiveness of an air bag, such as a side air bag configured to deploy in the space between a passenger and the side of the vehicle.

SUMMARY

In a first aspect, a vehicle comprises: a vehicle structure without a continuous roof rail; a B-pillar attached to the vehicle structure, the B-pillar having a first initiator; and a header attached to the B-pillar and extending at least partly across the vehicle, the header having a second initiator, wherein the first and second initiators are configured to provide a B-pillar deformation mode upon side impact.

Implementations can include any or all of the following features. The vehicle structure further comprises a side sill, and the B-pillar extends from the side sill. The vehicle structure further comprises a roof spine, and the header is connected to the roof spine. The B-pillar and the header are attached at an angle oriented outward relative to the vehicle, and the first and second initiators are configured so as to tend to preserve the angle upon the side impact. The angle is approximately 90 degrees. The first and second initiators are configured so the B-pillar deformation mode preserves an interior gap for an airbag. The vehicle structure further comprises at least one dual hinge door, and wherein the B-pillar and the header are positioned adjacent an opening for the dual hinge door. The B-pillar is positioned on one side of the vehicle, the vehicle further comprising another B-pillar on an opposite side of the vehicle, the other B-pillar having a third initiator. The B-pillar is configured to direct load along the header upon the side impact. At least one of the first and second initiators comprises a weakening in a material of the B-pillar or the header. At least one of the first and second initiators comprises an indentation in a material of the B-pillar or the header. The B-pillar has at least two first initiators, the first initiators positioned on respective ridges of, or respective corners of a cross-section profile of, the B-pillar. The second initiator comprises a narrowed portion of a profile of the header. The header has a side-to-side span on the vehicle, and wherein the narrowed portion is centered in the side-to-side span. The vehicle further comprises a reinforcement between at least the B-pillar and the header. The reinforcement comprises a reinforcement skeleton for a tube of an A-pillar, a tube of the B-pillar, and the header. The reinforcement comprises a formable material applied to a tube of an A-pillar, a tube of the B-pillar, and the header, which formable material subsequently hardens to form the reinforcement.

In a second aspect, a vehicle comprises: a vehicle structure without a continuous roof rail; a B-pillar attached to the vehicle structure; a header attached to the B-pillar and extending at least partly across the vehicle; means for providing a B-pillar deformation mode for the B-pillar and the header upon side impact.

BRIEF DESCRIPTION OF DRAWINGS

FIGS. 5-6 schematically show an example of a deformation mode.

DETAILED DESCRIPTION

This document describes examples of systems and techniques for providing a B-pillar deformation mode. In some implementations, the deformation mode of the B-pillar presents a friendly surface to the occupant in a side impact. This mode can provide occupant protection with lower deformations, and/or can provide a more stable gap between the B-pillar and the seating. For example, this can allow a side airbag to deploy in a robust manner. Some examples of B-pillars can be characterized in having minimum support from a roof rail. The drawings herein show examples relating to vehicle structures. However, the drawings are not prepared to scale and do not necessarily correspond to the structure or behavior of an actual vehicle.

Figure 1:
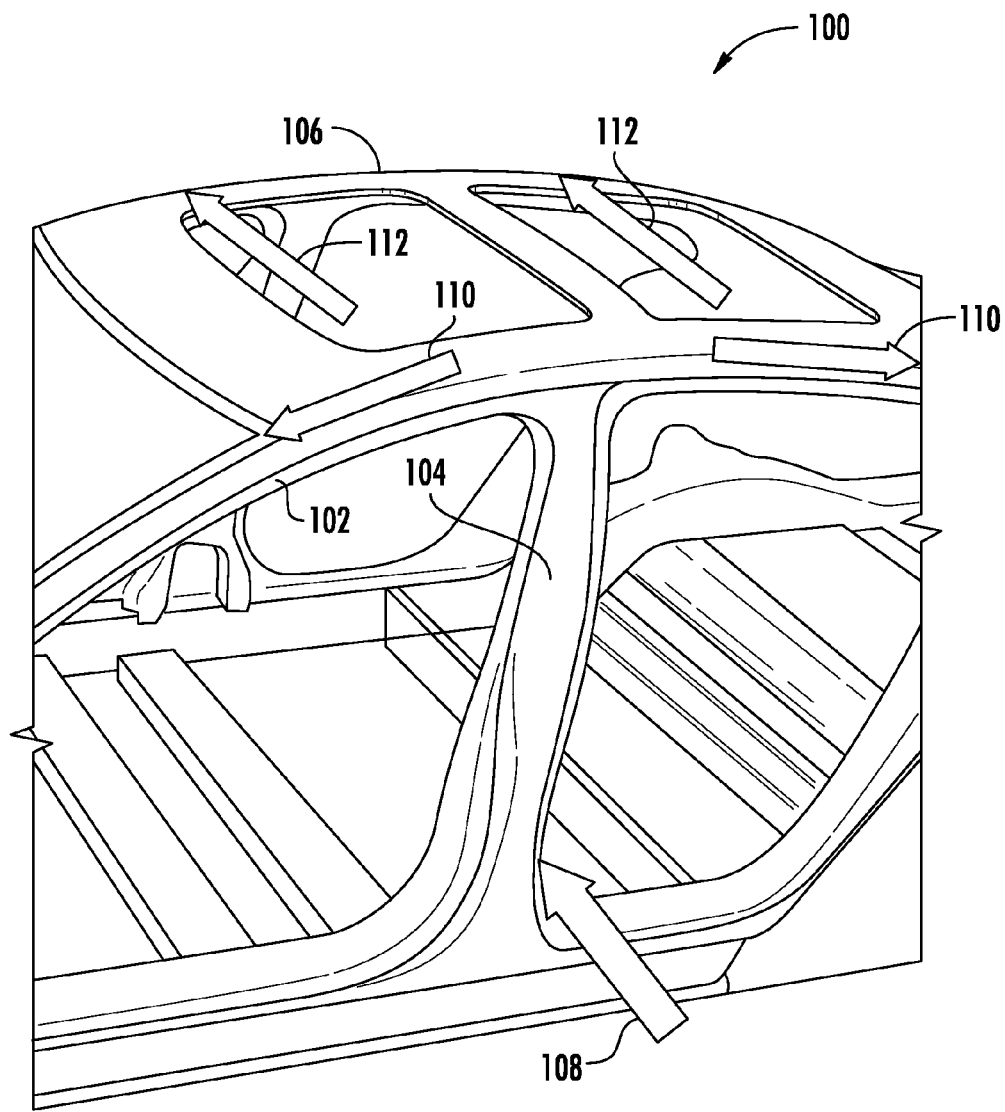
FIG. 1 shows load paths in a prior art vehicle.
Figure 2:
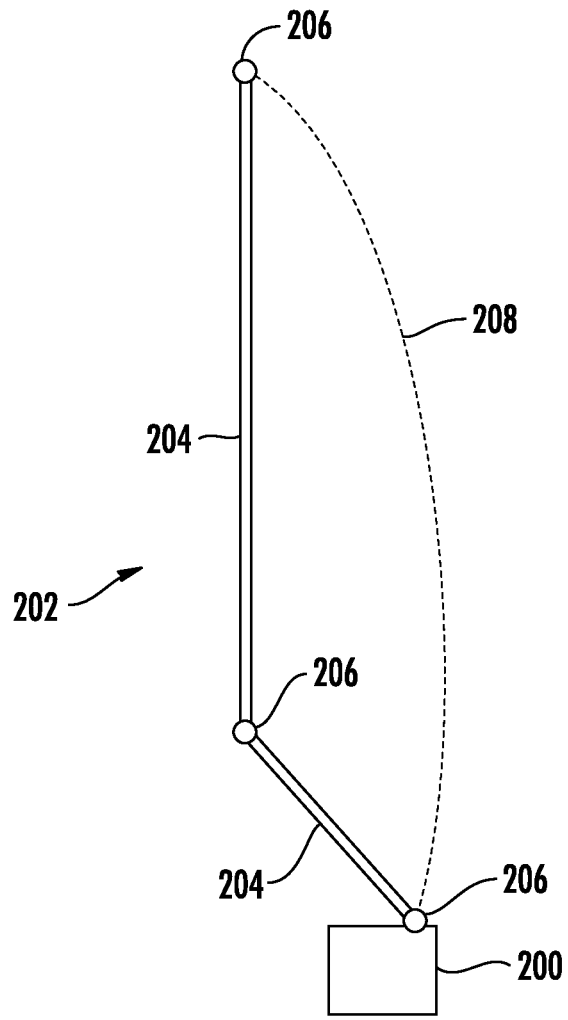
FIG. 2 schematically shows a bending mode in the prior art vehicle of FIG. 1.
Figure 3:
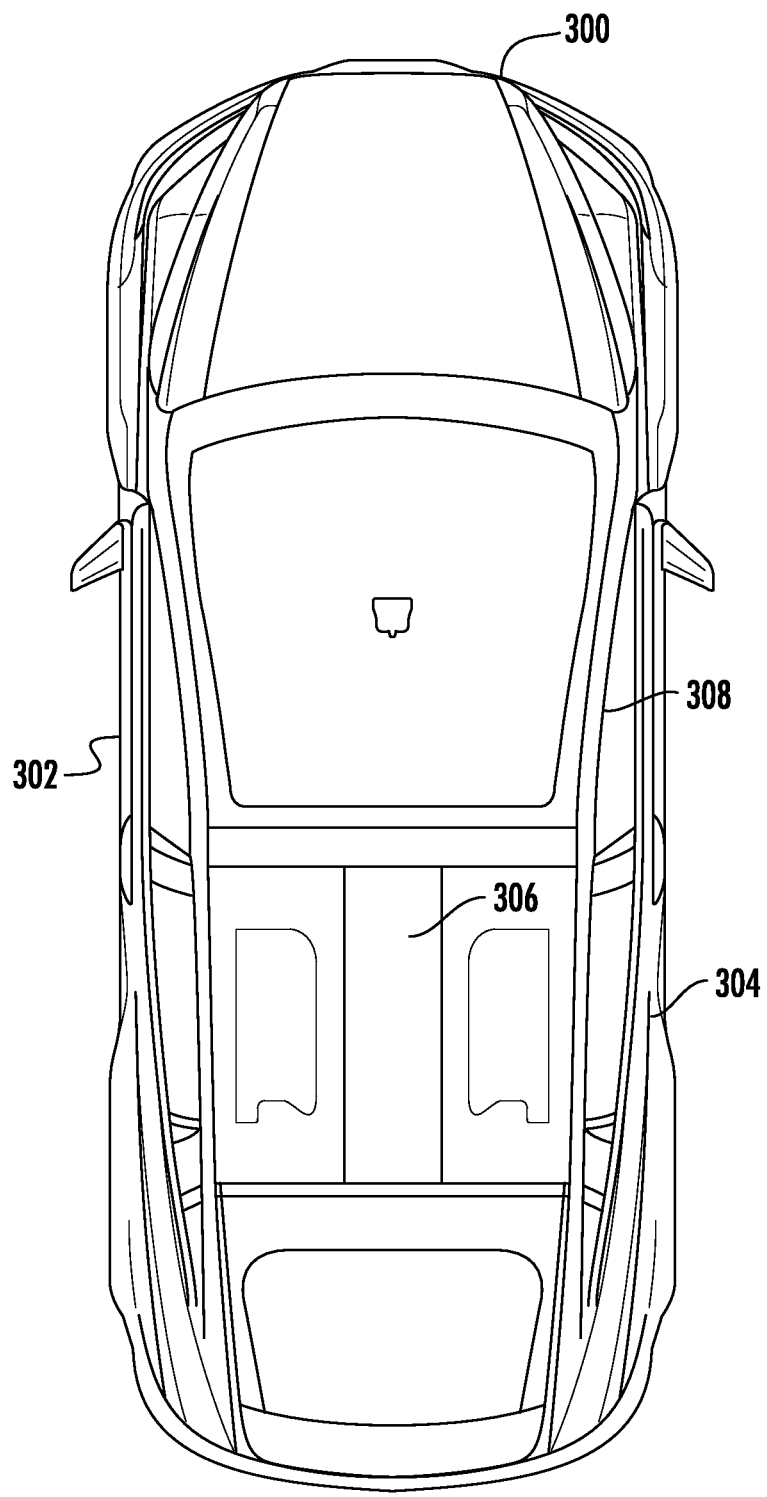
FIG. 3 shows an example of a vehicle having an embodiment of a B-pillar deformation mode.

FIG. 3 shows an example of a vehicle 300 having an embodiment of a B-pillar deformation mode. Here, the vehicle is shown in a top view that illustrates a set of first-row doors 302 and a set of second-row doors 304. The first-row doors can have conventional hinges that provide an essentially horizontal swing path. The second-row doors, on the other hand, are of the dual-hinge type and are configured to open in a generally vertical direction using at least two separately hinged portions per door. The dual-hinge door is here hinged relative to a spine 306 on a roof of the vehicle. Various types of multi-hinge doors can be used. For example, any or all structures described in the following U.S. patents can be used: U.S. Pat. Nos. 8,449,015; 8,511,738; 8,511,739; and/or D678,154, the contents of each of which are incorporated herein by reference.

One difference with dual-hinge doors is that a roof rail 308 on the vehicle is not continuous from the A-pillar to the C-pillar. Rather, the roof rail is interrupted so as to form the opening for the dual-hinge door. For example, that opening can include a substantially vertical aperture that transitions into a substantially horizontal aperture (i.e., in the vehicle's roof) so that they together form a complexly shaped opening that provides improved access to the second and third rows of the vehicle. Examples of providing a desired B-pillar deformation mode when the vehicle has no continuous roof rail will are described herein.

Figure 4:
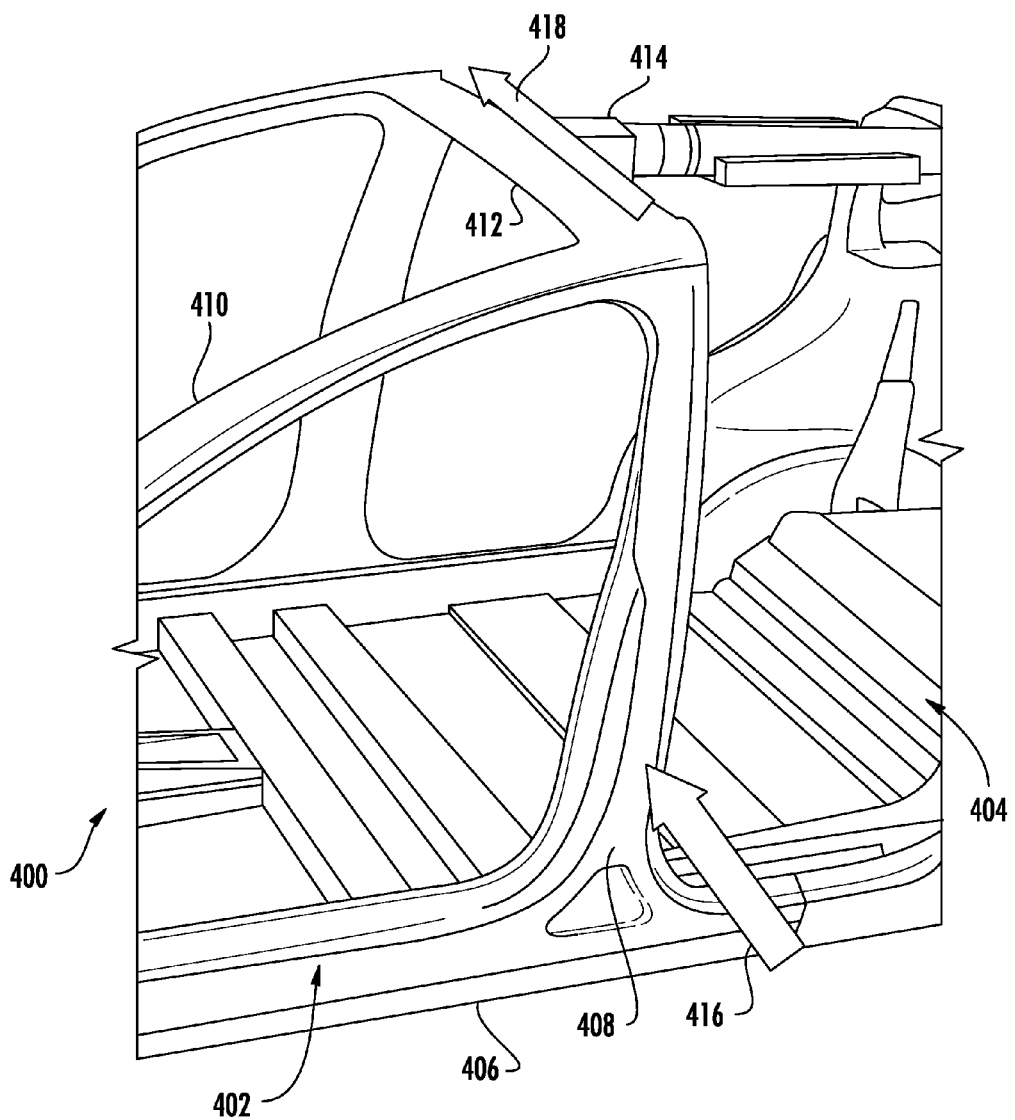
FIG. 4 shows an example of a load path in a vehicle.

FIG. 4 shows an example of a load path in a vehicle 400. Some vehicle components have here been removed for purposes of illustration so that the body structure is visible. The vehicle has an opening 402 for a first-row door (e.g., a conventionally hinged one) and an opening 404 for a dual-hinge door. A side sill 406 is part of the vehicle body and runs underneath the openings along the side of the vehicle. The side sill can be formed using any suitable technique, including, but not limited to, by extrusion. The side sill can be part of the vehicle's structures that protect against side impact crashes. For example, this improves safety for people traveling in the vehicle. As another example, in implementations that are powered by stored electric energy (e.g., electric vehicles) a battery pack or other energy storage system can be placed in the lower regions of the vehicle body. Such a battery pack can therefore also be protected by the side sill in a side collision.

The vehicle has a B-pillar 408 extending from the side sill. Here, the B-pillar extends in a substantially vertical direction, but other orientations can be used. The B-pillar can include one or more components. For example, a rigid inner member (e.g., a steel tube) can be combined with other components (e.g., outer panels) during manufacturing, so as to give the pillar its final shape.

The vehicle has an A-pillar that is here partially shown. For example, the A-pillar starts from a lower part of the front vehicle structure and then extends upward and rearward in the vehicle until it eventually meets with the end of the B-pillar.

The area where the pillars meet also serves as an attachment for a header 412. Here, the header extends across substantially the entire width of the vehicle. For example, the header is a rigid member that serves as part of the vehicle's roof. As such, the header and the B-pillar are here positioned adjacent the opening 404 for the dual-hinge door.

The vehicle body includes a spine 414. In some implementations, the spine extends rearward from the header towards other structure located aft in the vehicle. For example, the spine can serve as the attachment for the upper hinges of the respective dual-hinge doors. As such, the spine can be centrally positioned in the vehicle and be attached to the header at one end.

The vehicle body should provide protection in the event of a crash, including, but not limited to, a side impact. Here, an assumed side-impact collision is schematically illustrated using an arrow 416 that represents the impact load. This load will be at least partially transferred to other parts of the vehicle body. For example, an arrow 418 schematically illustrates load transfer from the B-pillar into the header.

The vehicle can have a symmetric design with regard to closures (e.g., doors) and their respective openings. Here, the opposite side of the vehicle has a first-row opening corresponding to the opening 402; similarly, the vehicle has another opening across from the dual-hinge opening 404. Accordingly, the opposite side of the vehicle can have a similar arrangement of a side sill, A-pillar and B-pillar corresponding to that discussed above. These structures can also attach to the header at an opposite end thereof. As such, the header can have a side-to-side span on the vehicle.

FIGS. 5-6 schematically show an example of a deformation mode. The former of these shows the B-pillar assembly in an undeformed state, and the latter after deformation from a load that impacts from the right in the figure. For example, these illustrations correspond to a view from the front of the vehicle, and the vehicle then receives an impact on its left side. A side sill 500 in the lower part of the vehicle is here shown, as well as a spine 502 at the upper part of the vehicle. Lines 504 and 506 (in part corresponding to the B-pillar) are shown connecting the side sill and the spine to each other. In that connection, joints 508 are formed so as to provide the vehicle structure with a B-pillar deformation mode. For example, the joints can include, but are not limited to, the boundaries between the pillar and the sill, an initiator (to be described below) on the pillar, and/or an initiator on the header. That is, a joint in this example represents a point where the B-pillar structure can be selectively deformed in the event of impact. The joint can be, but is not necessarily, a place where separate pieces or components have been attached to each other.

As such, the structures shown in this example form a header toward the top of the vehicle and a B-pillar extending along the vehicle side. The header is here represented by the line 506 and one of the joints, and the B-pillar is represented by the line 504 and the lower two joints. The header and the B-pillar form a specific angle with respect to each other. In this example, the angle is approximately 90 degrees. Other implementations can have a smaller or greater angle. With regard to the spine and the side sill, the angular shape of the B-pillar structure provides a certain amount of space in the interior of the passenger compartment. In some implementations, this space can accommodate one or more safety devices, such as a side airbag. For example, a space 510 here schematically illustrates that the airbag for optimal performance needs a sufficient amount of space between, on the one hand, the B-pillar, and, on the other, the passenger or passenger seat. In the event of a side impact collision, the structure of the B-pillar arrangement can help reduce intrusion into that interior gap.

An arrow 512 schematically represents a side impact load. The load here acts on the B-pillar at or near one of the lower joints 508. For example, the arrow can correspond to the typical height of a vehicle bumper, so as to represent an example of side impact from a vehicle in motion. The initiator 508 near where the load impacts can serve as a trigger for a controlled deformation of the B-pillar structure, so as to provide a desired B-pillar deformation mode.

Turning now to the post-impact state in FIG. 6, this example shows a deformation mode after some components have been subject to the crash loads. Particularly, some or all of the lines have been moved and/or rotated as a result of the crash, such transformation facilitated by the joints. However, the angle between the header and the B-pillar is seen to be less deformed in this example. For example, the angle between the B-pillar and the header was approximately 90 degrees before impact, and is approximately 90 degrees after the impact. That is, excessive intrusion of the B-pillar into the passenger compartment has been avoided in this example, such that the space for airbag deployment is less compromised.

That is, the foregoing is an example of structures that can be implemented in a vehicle that has no continuous roof rail (such as a vehicle with a dual-hinge closure). The vehicle structure can include a B-pillar, with that B-pillar having a first initiator that provides a B-pillar deformation mode upon impact. The vehicle structure can also have a header that is attached to the B-pillar and extends at least partly across the vehicle. That header can have a second initiator that is configured to provide the B-pillar deformation mode.

Figure 7:
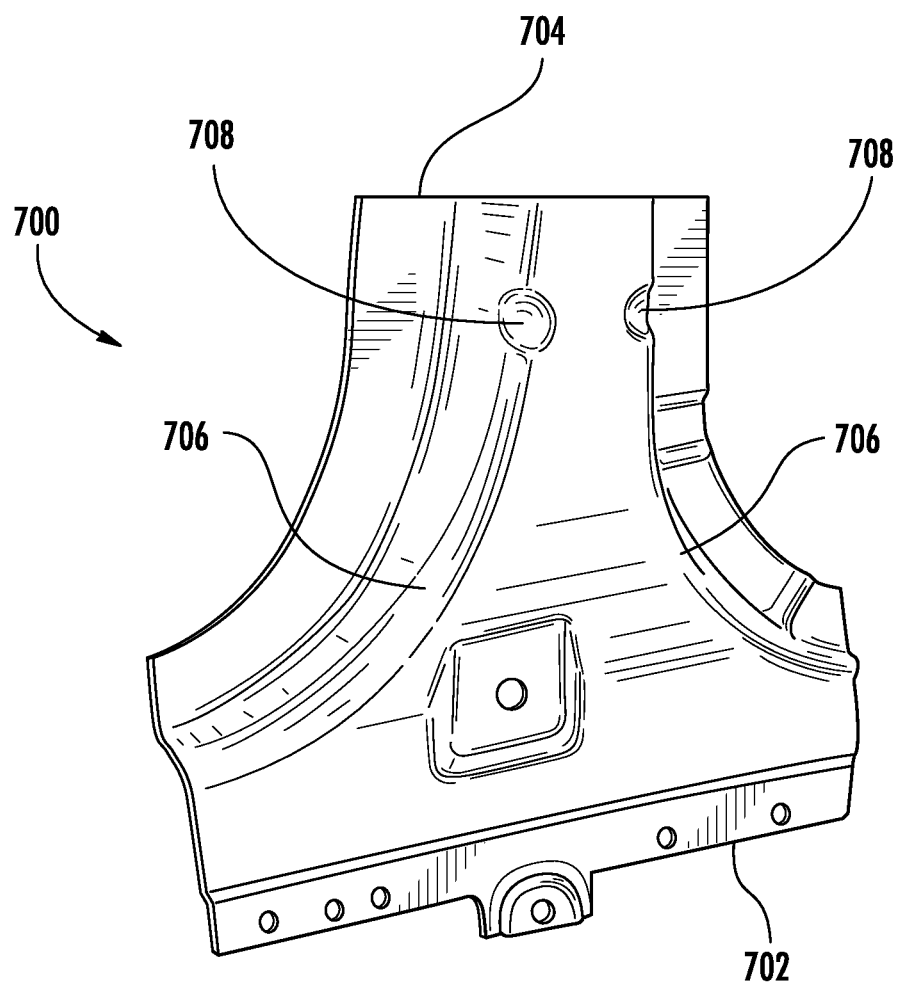
FIG. 7 shows examples of initiators.

FIG. 7 shows examples of initiators. This example uses a bottom portion 700 of a B-pillar for illustration. For example, the B-pillar can be any of the ones mentioned or shown herein. Particularly, an end 702 corresponds to where the B-pillar and the side sill are attached to each other, and another end 704 (in this truncated view) corresponds to where the B-pillar extends toward the header.

Here, the B-pillar has ridges 706. For example, these shapes can be formed in an outer panel of the B-pillar so as to provide stiffness. If the bottom portion were viewed in cross section from the end 704, the ridges or similar shapes would appear as corners in the profile visible in that perspective. Here, the B-pillar has two ridges at its bottom portion, but more or fewer ridges can be used in some implementations.

The B-pillar here has initiators 708. In this implementation, each of the ridges on the B-pillar has at least one initiator. For example, the initiators can be placed at the same height along the B-pillar as each other. In some implementations, at least one of the initiators corresponds to an indentation in a material of the B-pillar. The material here has one or more depressed areas compared to surrounding material. For example, this can be created by mechanically indenting the material at that location, or by manufacturing the component with an indented portion at that location. In some implementations, at least one of the initiators corresponds to a weakening in the material of the B-pillar. For example, the material can here be thinner than surrounding material, such as by having removed material from the piece at that location or by manufacturing the component with a thinned-out portion at that location. Here, the B-pillar has an initiator on each of its ridges at its bottom portion, but more or fewer initiators can be used in some implementations. The initiators can have any suitable shape, including, but not limited to, circular, triangular, polygonal, or an irregular shape.

Any or all of these initiators can provide a B-pillar deformation mode upon a crash event. In some implementations, the initiator(s) 708 can serve to cause a selective deformation of the B-pillar at that location (see, e.g., the joint 508 in FIGS. 5-6 that is impacted by the crash load).

For example, this can facilitate that the initial shape of the B-pillar/header structure becomes less compromised after the crash, thereby helping to reduce intrusion into the passenger compartment.

Figure 8:
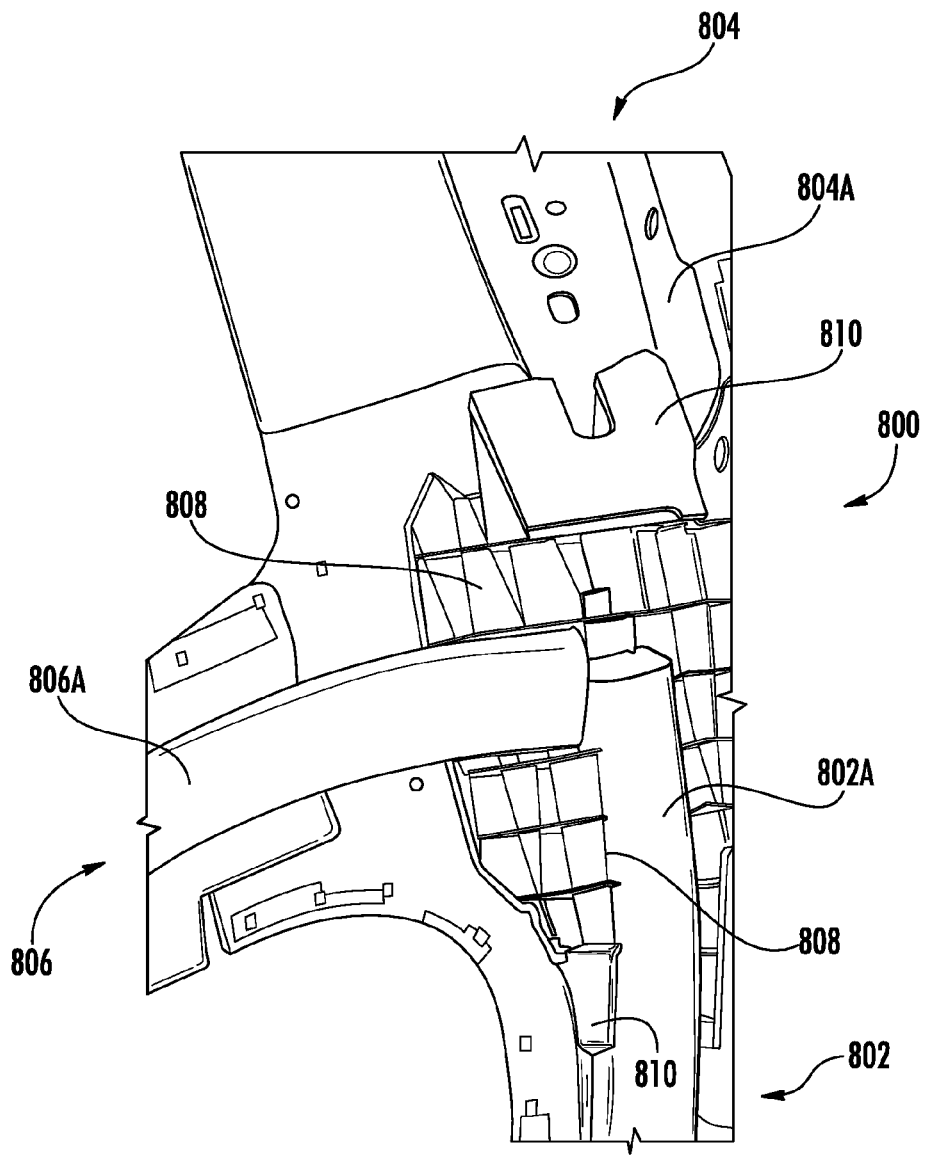
FIG. 8 shows an example of reinforcement structure for a B-pillar and a header.

FIG. 8 shows an example of reinforcement structure 800 for a B-pillar 802 and a header 804. In some implementations, the reinforcement also encompasses an A-pillar 806. For example, a beam 802A of the B-pillar, a beam 804A of the header, and a beam 806A of the A-pillar can be securely joined to each other by the reinforcement structure. The reinforcement serves to facilitate a desired B-pillar deformation mode by reducing the relative deformation between the B-pillar and the header.

In some implementations, the reinforcement structure includes a skeleton 808. For example, the skeleton can include a rigid structure shaped to at least partially enclose the respective ends of the pillars and the header, so as to help maintain their relationship to each other in a crash. The skeleton can be made from any suitable material, such as a polymer.

In some implementations, the reinforcement structure includes a formable material 810. In some implementations, the material includes an initially liquid or semi-liquid material such as a foam. Any suitable material such as a heat-curable foam can be used.

The following is an example of operations that can be performed in a manufacturing process. The ends of the pillars and the header can be arranged in their respective desired positions relative to each other. A skeleton can then (or earlier) be provided so as to at least partially enclose the ends and provide structural stiffness for the attachment area. A formable material can then be applied or injected so as to at least partially envelop the skeleton and the respective ends. The flowable material can thereafter be hardened, such as by a curing process. For example, a subsequent heat treatment stage can cause the material to harden and thereby form a rigid enclosure around the skeleton and the respective pillar ends and the header. In some implementations, the vehicle structure can be provided with a cassette that encloses this area (i.e., the B-pillar/header connection) and a foaming material can fill all empty space in the cassette after the hardening process.

Figure 9:
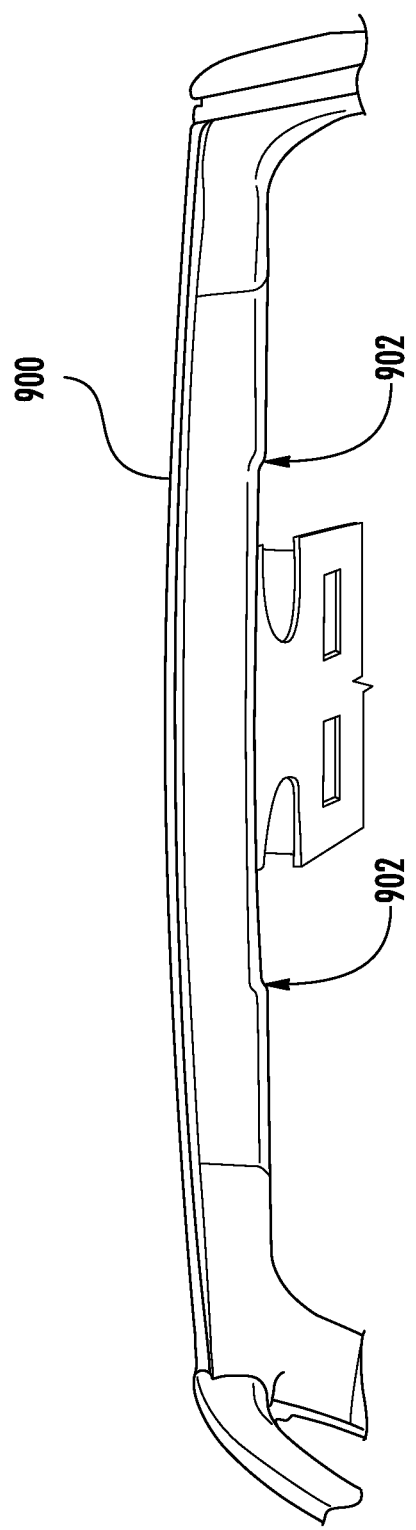
FIG. 9 shows an example of a header for an embodiment of a B-pillar deformation mode.

FIG. 9 shows an example of a header 900 for an embodiment of a B-pillar deformation mode. In some implementations, the header is configured to extend across the vehicle, for example between respective B-pillars thereof. As such, the header can form a side-to-side span that covers essentially the entire width of the upper vehicle body. The header can have one or more initiators. In some implementations, one or more narrow portions can define an initiator. For example, the header's cross-section profile can have at least one step 902 where the thickness of the header changes. A narrow portion of the header can be positioned in a center of the side-to-side span. The narrow portion can serve to provide a desired B-pillar deformation mode.

Figure 10:
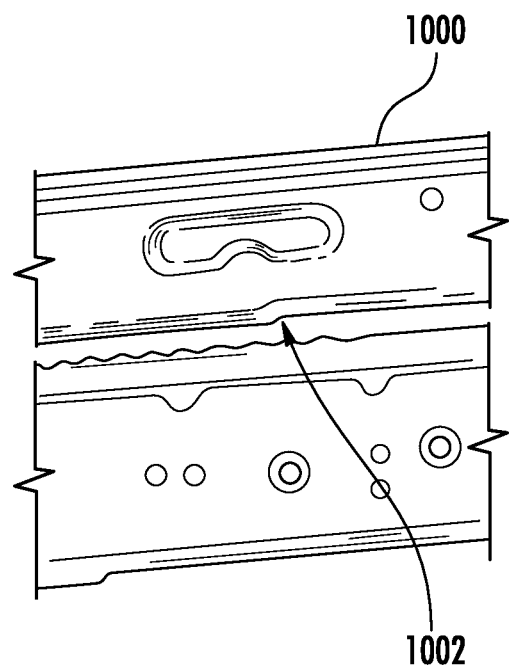
FIG. 10-11 show examples of initiators for the header in FIG. 9.
Figure 11:
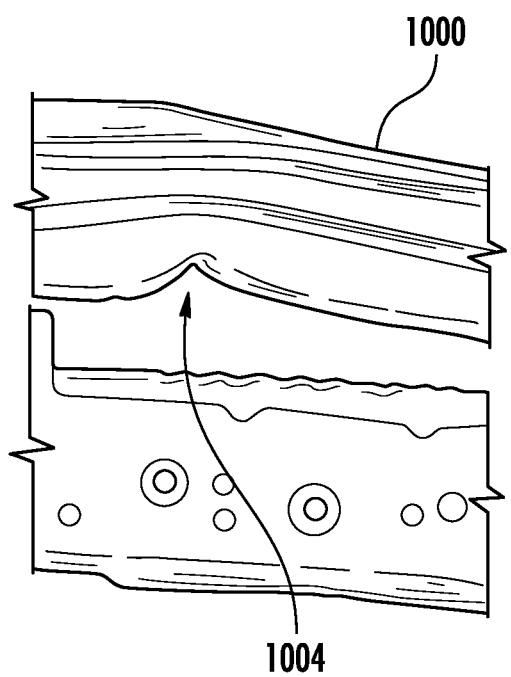

FIG. 10-11 show examples of initiators for the header in FIG. 9. These examples involve a header 1000, which can be any or all headers described or shown herein. The header has an initiator 1002 in one area and an initiator 1004 in another area. These initiators can be any initiator described herein. In some implementations, each of these initiators includes a narrowing of the cross-section profile of the header. For example, the header can have a central portion with a narrower profile, and the initiators can define the respective ends of that narrower profile. As such, the header can have multiple initiators at each end of the narrow portion.

The initiator 1002 has not been triggered. As such, at that side of the header no B-pillar deformation mode has yet occurred. The initiator 1004, on the other hand, is shown post impact. As such, that initiator has serve to initiate the deformation that is part of the B-pillar crash response mode. The header has here been slightly bent as a result of the impact. For example, this can help the pillar/header connection maintain its original orientation more intact also after a side impact.

A number of implementations have been described as examples. Nevertheless, other implementations are covered by the following claims.

What is claimed is:

1. A vehicle comprising:
   a vehicle structure without a continuous roof rail;
   a B-pillar attached to the vehicle structure, the B-pillar having a first initiator; and
   a header attached to the B-pillar and extending at least partly across the vehicle, the header having a second initiator, wherein the first and second initiators are configured to provide a B-pillar deformation mode upon side impact.

2. The vehicle of claim 1, wherein the vehicle structure further comprises a side sill, and wherein the B-pillar extends from the side sill.

3. The vehicle of claim 1, wherein the vehicle structure further comprises a roof spine, and wherein the header is connected to the roof spine.

4. The vehicle of claim 1, wherein the B-pillar and the header are attached at an angle oriented outward relative to the vehicle, and wherein the first and second initiators are configured so as to tend to preserve the angle upon the side impact.

5. The vehicle of claim 4, wherein the angle is approximately 90 degrees.

6. The vehicle of claim 1, wherein the first and second initiators are configured so the B-pillar deformation mode preserves an interior gap for an airbag.

7. The vehicle of claim 1, wherein the vehicle structure further comprises at least one dual hinge door, and wherein the B-pillar and the header are positioned adjacent an opening for the dual hinge door.

8. The vehicle of claim 1, wherein the B-pillar is positioned on one side of the vehicle, the vehicle further comprising another B-pillar on an opposite side of the vehicle, the other B-pillar having a third initiator.

9. The vehicle of claim 1, wherein the B-pillar is configured to direct load along the header upon the side impact.

10. The vehicle of claim 1, wherein at least one of the first and second initiators comprises a weakening in a material of the B-pillar or the header.

11. The vehicle of claim 1, wherein at least one of the first and second initiators comprises an indentation in a material of the B-pillar or the header.

12. The vehicle of claim 1, wherein the B-pillar has at least two first initiators, the first initiators positioned on respective ridges of, or respective corners of a cross-section profile of, the B-pillar.

13. The vehicle of claim 1, wherein the second initiator comprises a narrowed portion of a profile of the header.

14. The vehicle of claim 13, wherein the header has a side-to-side span on the vehicle, and wherein the narrowed portion is centered in the side-to-side span.

15. The vehicle of claim 1, further comprising a reinforcement between at least the B-pillar and the header.

16. The vehicle of claim 15, wherein the reinforcement comprises a reinforcement skeleton for a tube of an A-pillar, a tube of the B-pillar, and the header.

17. The vehicle of claim 1, wherein the reinforcement comprises a formable material applied to a tube of an A-pillar, a tube of the B-pillar, and the header, which formable material subsequently hardens to form the reinforcement.

18. A vehicle comprising:
    a vehicle structure without a continuous roof rail;
    a B-pillar attached to the vehicle structure;
    a header attached to the B-pillar and extending at least partly across the vehicle;
    means for providing a B-pillar deformation mode for the B-pillar and the header upon side impact.

* * * * *